J. BLACKWOOD.
Seed-Planter.
No. 12,307.
Patented Jan. 30, 1855.
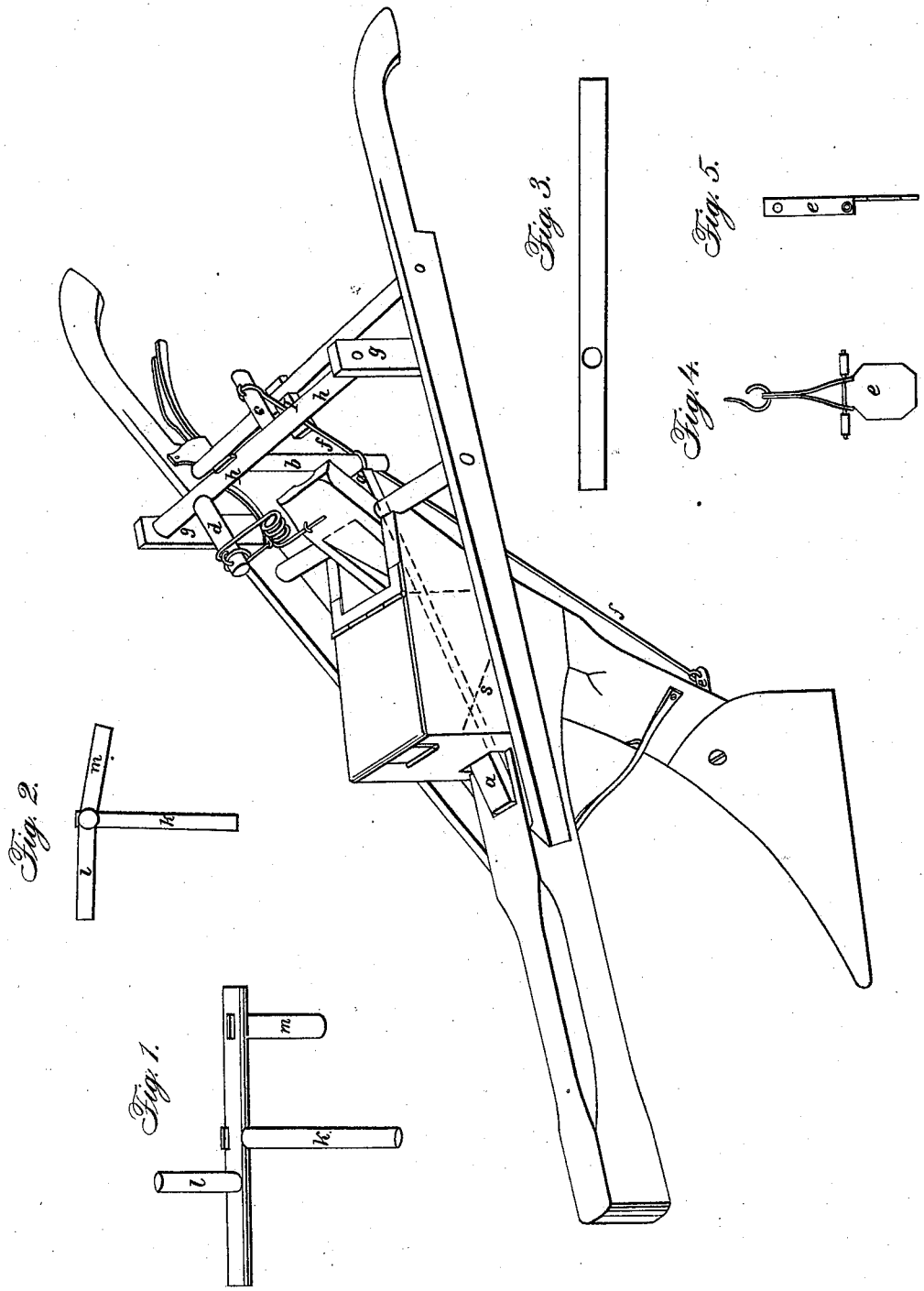

UNITED STATES PATENT OFFICE.

JOHN BLACKWOOD, OF FRANKLIN COUNTY, OHIO.

IMPROVEMENT IN SEED-PLANTERS.

Specification forming part of Letters Patent No. 12,307, dated January 30, 1855.

*To all whom it may concern:*

Be it known that I, JOHN BLACKWOOD, of the county of Franklin and State of Ohio, have invented a new and useful labor-saving machine for planting corn in hills to tend both ways; and I do hereby declare that the following is a full, clear, and exact description of the construction and operation of the same, reference being had to the annexed drawings, making a part of this specification, in which—

Plate 1 is a perspective view; Figure 1, a front view of the axis and levers; k, the slide-lever; l, the valve-lever; m, the draft and spring lever. Fig. 2 is an end view of said axis and levers as lettered above; Fig. 3, the slide; Fig. 4, the valve; Fig. 5, an edge view of said valve.

To enable others skilled in the art to make and use my invention, I will proceed to describe its construction and operation.

The general form is similar to a shovel-plow with a hopper on the beam. I shape the stock on the most approved form of the stock of a shovel-plow, boring an inch hole down through it from top to bottom, entering at the front above and running out near the back below at the proper height and bevel for the beam. I cut a gain on each side of the stock, making a double tenon on the beam to fill said gain. Just below the cross-piece I make a mortise for the slide, beveled so that the end of the slide will strike the beam one foot before the stock. The bottom of the hopper is made with the same bevel, so that the slide marked $a\ a$ runs along it under the corn, and where it passes through the partition marked in the drawings by red dotted lines I make the mortise one-half inch above the slide. To prevent the corn from passing out too fast, I secure a stiff brush above the slide to keep back any superflous grains that may lodge on the cup. To draw the slide out I extend an axis between the handles, (marked $h\ h$.) To the handles I affix two standards for said axis to run in, (marked $g\ g$.) In the center of said axis put the lever $b$ to draw back the slide so as to bring the cup over the tube, into which it drops sufficient seed to plant one hill. At the bottom of the tube I make a valve of thin iron, (marked $e$,) which is operated by another lever near the center of said axis, (marked C,) which is attached to the valve by the wire $f\ f$. Also, to said axis I affix another lever, (marked $d$,) to which I attach the spring that drives the slide back into the hopper under the corn and closes the valve before the corn falls on it, and holds it there in readiness for the next furrow. I do away with all the difficulty of scattering the corn between the rows by the combination of the valve and slide, as the corn is dropped instantly in its place, having only about two inches to fall, and the same motion that drops the hill of corn from the valve draws the slide and places another hill of corn on the valve. To the handle I affix another lever working on a fulcrum just before the hand-hold, which I make of iron, and to which I attach the lever $d$ by a wire, so that the operator can, by a grip of the hand, drop a hill of corn at pleasure. The piece in the back cross-piece marked $i$ is the stop or guard against which the slide-lever $b$ strikes. The dotted line marked S shows the position of the double bottom; the red dotted line the position in the hopper. The front apartment is covered with a lid to prevent the corn from spilling. The back part I leave open, that the operator can see the corn in the cup as it passes over the tube. To construct the valve I take a piece of thin iron three inches long by one and one-half wide in the center of the length. I punch two holes near the edges. The edges I then turn over so that a piece of wire will pass through for it to play on. The one end I press together for the shank, through which I make a hole for the wire to pass which opens it. I use heavy bucket-wire for all the levers to pull by, and of which I make a spiral spring to force the slide back under the corn. The share I make of commmon shovel mold compressed at the side so that the ground will fall back in the furrow sufficient to cover the seed and to enable the farmer to see that every hill of corn is planted accurately in its proper place. I extend the wings back so that he can see the corn on the ground before it is covered.

What I claim as my invention, and desire to secure by Letters Patent in the above-described machine for planting corn and other seed, is—

The additional hopper to catch the seed which falls off of the slide after it passes the brush, substantially as described.

JOHN BLACKWOOD.

Witnesses:
   JAMES ANDREW,
   CALEB BROLST.